United States Patent [19]
Stevenson

[11] 4,094,045
[45] June 13, 1978

[54] COUPLING DEVICE AND METHOD

[76] Inventor: Curtis A. Stevenson, 3722 E. Pasadena, Phoenix, Ariz. 85018

[21] Appl. No.: 681,801

[22] Filed: Apr. 30, 1976

[51] Int. Cl.² .................... F16G 11/00; A01K 91/04
[52] U.S. Cl. ................... 24/131 C; 43/44.83; 24/131 R
[58] Field of Search ............... 24/131 R, 131 C, 115; 43/44.83, 44.85

[56] References Cited

U.S. PATENT DOCUMENTS

| | | | |
|---|---|---|---|
| 1,281,958 | 10/1918 | Higgins | 24/131 R |
| 1,356,316 | 10/1920 | Shepherd | 24/131 C |
| 2,227,420 | 1/1941 | Augenblick | 24/131 C |
| 2,636,307 | 4/1953 | Mason et al. | 43/44.83 |
| 2,709,287 | 5/1955 | Shelton et al. | 24/131 C |
| 3,145,068 | 8/1964 | Neale | 24/131 C |

*Primary Examiner*—Paul R. Gilliam
*Assistant Examiner*—Victor N. Sakran
*Attorney, Agent, or Firm*—Cahill, Sutton & Thomas

[57] ABSTRACT

A coupling device and method for attaching a length of flexible line thereto. The device is a spring member composed of first and second sections of aligned coils providing a longitudinally extending central channel having an entrance and exit port. The first section is integral with the second section and spaced therefrom to provide a gap into which is wound a segment of the line material after having passed through the central channel from the entrance port to the exit port. After winding through the gap, the material is wound clockwise toward the entrance port between pairs of adjacent coils to complete attachment to the coupling device.

6 Claims, 6 Drawing Figures

U.S. Patent   June 13, 1978   4,094,045
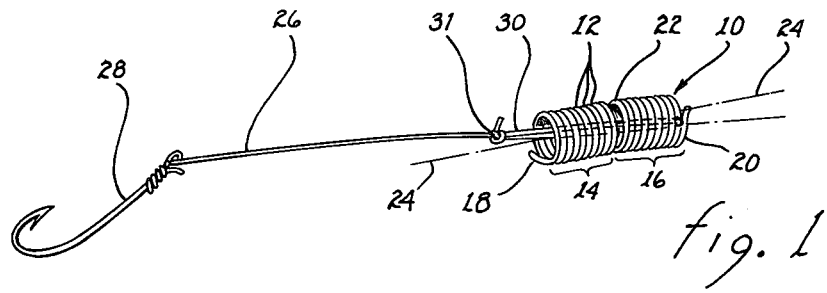
fig. 1
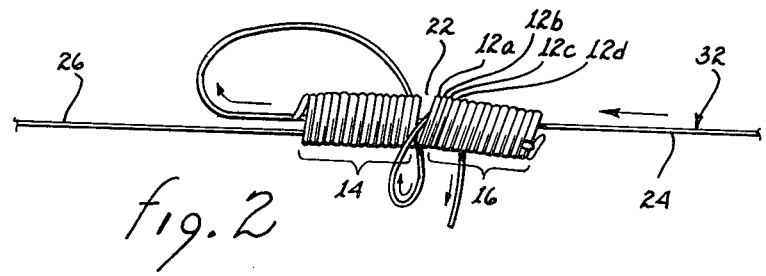
fig. 2
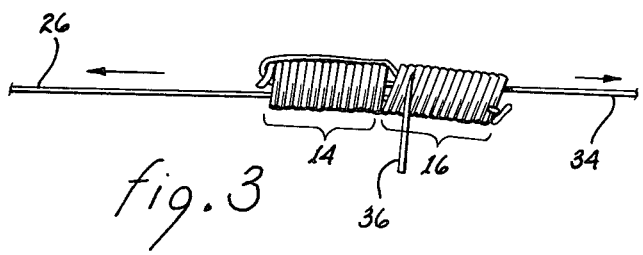
fig. 3
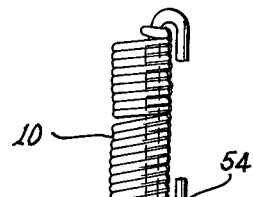
fig. 6
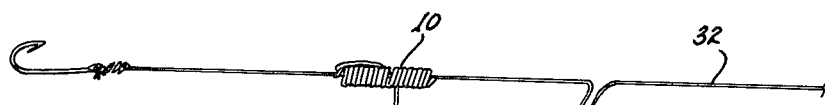
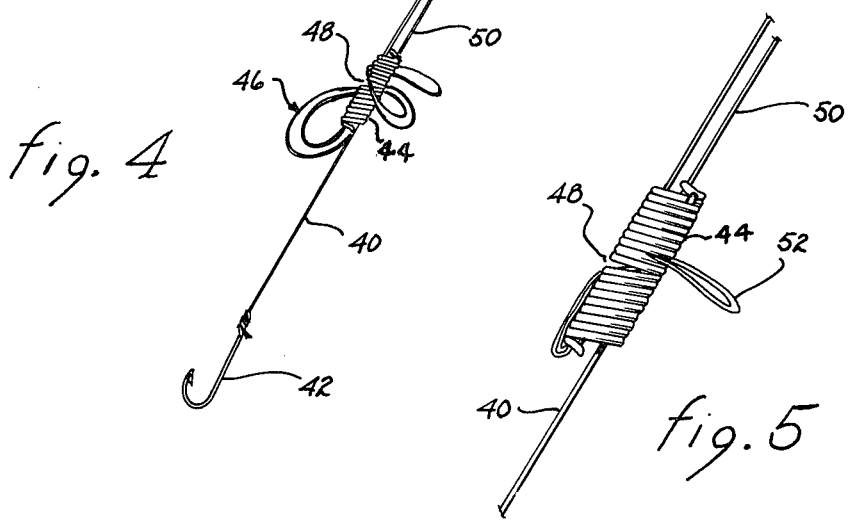
fig. 4
fig. 5

COUPLING DEVICE AND METHOD

BACKGROUND OF THE INVENTION

This invention relates to a coupling device and method for attaching a flexible line to the device for coupling of the line to a second article attached to such device. While the invention will be described in relation to coupling a fishing line to a leader for a hook or lure, or directly to a hook or lure, it is to be understood that the invention has general application.

Numerous devices have been developed to couple or link two lengths of line material or a length of line to a lure or hook. Such devices are particularly popular to fishermen who do not wish to rely on conventional hand-tied knots to perform the task. In some cases, operation of the device itself is more complicated than tying a suitable knot. In other cases, the device does not provide a coupling of sufficient strength to assure integrity during use. Further, it is desirable that the coupling result in axial alignment of the line and coupled article with the coupling device.

SUMMARY OF THE INVENTION

It is an object of this invention to provide a coupling device and method for using same which is relatively simple, inexpensive, and results in a coupling which will retain its integrity during use.

Another object is a device for coupling a length of flexible line to an article in a manner that provides axial alignment of the coupling device with the line and article.

A still further object is to provide a coupling device for a flexible line material which will allow the flexible line material to be readily detached from the coupling device when desired.

These and other objects of the present invention are provided in one aspect of the invention by a spring member in the form of a plurality of tightly wound, aligned coils. The spring member includes first and second coil sections separated by a gap which receives a winding of the flexible line to be attached. The structural details and method of operation are best described in conjunction with the attached drawings.

BRIEF DESCRIPTION OF THE DRAWINGS

FIG. 1 is a perspective view of the device of the present invention with a snelled hook attached;

FIG. 2 is a side elevational view of the device of FIG. 1 with a line being attached thereto;

FIG. 3 is a side elevational view of the device of the present invention with the line shown in FIG. 2 attached thereto;

FIG. 4 is a view of the device of the present invention being employed to attach a dropper hook;

FIG. 5 is a view showing completion of the operation shown in FIG. 4; and

FIG. 6 is an elevational view of a second embodiment of the device of the present invention.

Referring to FIG. 1, a spring member 10 is composed of a series of coils 12. Spring member 10 includes a first set of coils forming a first section 14 and a second set of coils forming a second section 16. First section 14 has a terminal coil 18; second section 16 has a terminal coil 20. There is a permanent gap 22 separating sections 14 and 16. The coils of first section 14 are tightly wound and are biased toward section 16. Similarly, the coils of second section 16 are tightly wound and are biased toward section 14. Each of the coils 12 is preferably equidiameter and has a center along the central axis 24 of spring member 10. Terminal coil 18 has a turned out end as does terminal coil 20 to facilitate attaching a loop to the terminal coils as will be explained hereinafter. Attached to spring member 10 is a snelled leader 26 to the end of which is attached hook 28. Leader 26 has a loop 30 tied at 31. The latter is passed through the central channel defined by coils 12 and the end of terminal coil 20 is inserted in the loop 30. The spring member 10 is then effectively rotated so that loop 30 travels inwardly towards gap 22 along coils 12. This ensures that loop 30 will be positioned between a pair of inner coils 12 of second section 16. Any pull in the direction of hook 28 will draw the coil 12 on the side of loop 30 away from the direction of pull towards the adjacent coil 12 thereby compressing loop 30 between adjacent coils and increasing the hold of spring member 10 on the loop 30.

Referring to FIG. 2, a second line 32 is shown in an intermediate stage of attachment to spring member 10. Line 32 is passed entirely through the central channel of spring member 10, then brought back over the top of first section 14, and wound clockwise through gap 22. After being wound into gap 22, line 32 is then wound in a clockwise direction between coils 12a and 12b, then between coils 12b and 12c and then between coils 12c and 12d of second section 16. Winding between adjacent pairs of coils starting with the pair adjacent gap 22 is optional but preferred for a neater, tighter connection of line material 32 to spring member 10.

The main segment 34 of line 32 is then pulled to the right (see FIG. 3) as leader 26 is pulled to the left to draw the line and leader tight as shown in FIG. 3. End segment 36 of line 32 may then be trimmed close to spring member 10. To remove line 32 and leader 26 from spring member 10, the above procedure is simply reversed.

As can be seen from FIG. 3, a pull to the left such as when a fish is hooked will pull coils 12 of second section 16 in the direction of the pull, thereby tightening the grip of adjacent coils 12a and 12b, 12b and 12c, and 12c and 12d on the repsective segments of line 32 between such pairs. This ensures that end segment 36 will not slip or come loose when a fish is hooked or a pull is otherwise exerted on leader 26.

FIG. 4 illustrates the attachment of a dropper line to the main line 32. A second leader 40 with hook 42 is attached to spring member 44 in the manner described above for leader 26. A loop 46 is made in line 32 and loop 46 is passed through the central channel of spring member 44. The loop 46 is then attached to spring member 44 in the same manner as line 32; being wound clockwise into the intermediate gap 48 and then clockwise between adjacent pairs of coils toward line 32. Pulling on leader 40 and segment 50 of loop 46 in opposing directions tightens loop 46 on spring member 44 as shown in FIG. 5. Segment 52 of loop 46 is not cut or trimmed.

FIG. 6 illustrates a second embodiment of spring member 10 in which a weight 54 of lead or other suitable material is attached by extending through the central channel and being bent over opposing ends of the spring member 10.

The spring member of this invention may be constructed of any material suitable for coil springs. A preferred material is spring steel. Clear polyurethane may also be used. The spring member not only provides a means of coupling a line and a leader but may also be employed to connect a lure or hook having an eye to a line. In the latter case, one end of the terminal coil is passed through the eye and the lure or hook turned around the coil so that it moves inwardly to an inner coil. The line is then passed through the central channel as described above, through the eye, and then wound around the intermediate gap in the spring member and adjacent coils as above described. In the case of coupling a leader to a line, the leader may have a hook attached as shown in the drawings, or it may have a swivel and snap attached thereto. A lure may then be connected to the snap in a conventional manner. Attachment of the line or lure to the spring member is such a simple operation that it can be done in the dark, a boon for nightfishermen. The spring member of the present invention does not require any knot tying and keeps the hook or lure away from the line. The line and leader may be of braided or monofilament construction. As noted above, the spring member may be employed for flexible line material of any type and is not limited to use as an item of fishing equipment. The terminal coils 18 and 20 are turned out as shown in the drawings. Not only does this facilitate attachment of loops to the spring member but it allows the line to slip between the terminal coils and the adjacent coil and to do so without the line being frayed or severed by the edges of the tip of the terminal coils.

Separation of the first and second sections of the spring member is highly desirable to facilitate initial insertion of the line between intermediate coils. However, in practicing the method of this invention, the spring member may be entirely closed, i.e., no permanent gap between intermediate coils.

What is claimed is:

1. A coupling device for releasably interconnecting a first length of flexible line having a loop disposed at the connecting end thereof with a second length of flexible line, said coupling device comprising in combination:
   a. a continuous uninterrupted coiled spring member for receiving and lockingly gripping segments of the first and second lengths of flexible line intermediate selected ones of the coils of said spring member, said spring member including a central channel extending therethrough;
   b. a first coil section for engaging the first and second lengths of flexible line and formed as one part of said continuous uninterrupted spring member, said first coil section defining one part of said central channel, said first coil section including a first terminal coil for penetrably engaging the loop of the first length of flexible line brought through said central channel to said first terminal coil;
   c. a second coil section for supporting a folded over section of the second length of flexible line and formed as another part of said continuous uninterrupted spring member, said second coil section defining another part of said central channel, said second coil section including a second terminal coil for supporting the folded over section of the second length of flexible line brought through said central channel in a direction opposite that of the first length of flexible line;
   d. a gap disposed intermediate two adjacent coils of said continuous uninterrupted spring member for segregating said first coil section from said second coil section, said gap providing access to penetration intermediate two coils of said first section by the folded over segment of the second length of flexible line extending from said second terminal coil and along the outer periphery of said second coil section;

whereby, opposed pulling forces exerted upon the first and second lengths of flexible line compress the coils of said first coil section to grip the loop of the first length of flexible line penetrably engaged by said first terminal coil and the folded over segment of the second length of flexible line disposed intermediate two coils of said first coil section.

2. The coupling device as set forth in claim 1 wherein said gap comprises the displacement intermediate two adjacent coils of said continuous uninterrupted coiled spring member.

3. The coupling device as set forth in claim 2 wherein the periphery of said spring member defines a constant diameter cylinder.

4. The coupling device as set forth in claim 3 wherein the ends of said first and second terminal coils are bent away from their respective coil sections.

5. The coupling device as set forth in claim 4 wherein said gap is centrally disposed within said continuous uninterrupted coiled spring member.

6. The coupling device as set forth in claim 1 including a weight member extending through said central channel, said weight member including ends folded over the respective ones of said first and second terminal coils for retaining said weight member upon said continuous uninterrupted spring member.

* * * * *